United States Patent Office 3,511,790
Patented May 12, 1970

3,511,790
PREPARATION OF POLYIMIDE FOAMS
Ralph E. De Brunner, Kettering, Ohio, and John K. Fincke, Chapel Hill, N.C., assignors to Monsanto Research Corporation, St. Louis, Mo., a corporation of Delaware
No Drawing. Filed Dec. 20, 1966, Ser. No. 603,180
The portion of the term of the patent subsequent to Jan. 21, 1986, has been disclaimed
Int. Cl. C08f 47/10; C08j 1/26, 1/18
U.S. Cl. 260—2.5                 10 Claims

ABSTRACT OF THE DISCLOSURE

Process for preparing polyimide foam by heating at 150–500° C. a mixture of (I) an ester having the formula $$HO-\overset{O}{\underset{\|}{C}}-R-\overset{O}{\underset{\|}{C}}-OH$$
$$(O=\overset{|}{C}-O\text{-alk-}OY)_2$$

wherein R is a tetravalent aromatic radical of 6–24 carbon atoms, alk is alkylene of 2–8 carbon atoms, and Y is hydrocarbyl of 1–8 carbon atoms, (II) an aromatic diamine and (III) an inert organic solvent.

This invention relates to foamed compositions and more particularly provides a new and valuable method of producing foamed polyimides.

In prior art, foamed polyimide particles have been produced by incorporating a blowing agent into a solution of a polyimide-forming prepolymer and curing the resulting mixture. See, e.g., the W. R. Hendrix Pat. No. 3,249,561, wherein there is used as blowing agent a gas-producing acid such as oxalic, malonic, citric or formic acid. During the curing step, the acid decomposes to give bubbles of carbon dioxide and/or carbon monoxide in the solution. This causes foaming of the solution; and, as the solution foams, it is converted to the solid, porous polyimide when exposed to curing temperatures. However, use of the gas-liberating acids for producing the foam is difficult to control.

The polyimides are usually prepared by reaction of an aromatic tetracarboxylic acid dianhydride with an organic diamine to obtain an intermediate, curable prepolymer wherein there are present amide linkages from an amino group of the diamine and a carboxy group of the tetracarboxylic component, with two carboxy groups of the tetracarboxylic component being unlinked to the organic amine component. Upon heating at elevated temperatures, intramolecular cyclization occurs with reaction of the unreacted carboxylic group at the amide portion of the polymer to give an imide structure. Thus, condensation of, say, 1,2,4,5-benzenetetracarboxylic dianhydride and p-phenylenediamine to give a prepolymer amide-acid and curing of the latter to a polyimide proceeds substantially as follows:

where $n$ denotes the degree of polymerization.

Now we have found that for the preparation of foamed polyimides, use of a blowing agent can be dispensed with when there is used a heat-reactive, polyimide-forming liquid composition or varnish prepared by contacting (I) a diamine of the formula $H_2N-Z-NH_2$ wherein Z is an aromatic radical having from 6 to 18 carbon atoms and being free of olefinic and acetylenic unsaturation and of substituents which react with the carboxy radical more readily than does the amine radical, with (II) an ester of the formula $$HO-\overset{O}{\underset{\|}{C}}-R-\overset{O}{\underset{\|}{C}}-OH$$
$$(O=\overset{|}{C}-O\text{-alk-}OY)_2$$

wherein R is a tetravalent aromatic radical of from 6 to 24 carbon atoms, is free of olefinic and acetylenic unsaturation and of substituents which react with the amine radical more readily than does a radical containing the $$-\overset{O}{\underset{\|}{C}}-$$

linkage, and wherein one pair of the radicals $$-\overset{O}{\underset{\|}{C}}-OH$$

and $$-\overset{O}{\underset{\|}{C}}-O\text{-alk-}OY$$

is positioned at a first pair of non-tertiary nuclear carbon atoms which are immediately consecutive and wherein the other pair of the radicals $$-\overset{O}{\underset{\|}{C}}-OH$$

and $$-\overset{O}{\underset{\|}{C}}-O\text{-alk-}OY$$

is positioned at a second pair of non-teritary nuclear carbon atoms which are immediately consecutive, said second pair being separated from the first pair by at least one carbon atom; alk denotes an alkylene radical having from 2 to 4 carbon atoms in the chain and a total of from 2 to 8 carbon atoms; and Y is a hydrocarbyl radical free of olefinic and acetylenic unsaturation and containing from 1 to 8 carbon atoms; and (III) an inert, volatilizable, organic liquid solvent for said ester.

The heat-reactive liquid mixture or varnish which we use for production of the foamed polyimide is described and claimed in copending application Ser. No. 561,755, filed June 30, 1966. Briefly, the above-depicted ester is first prepared by reacting an appropriate aromatic tetracarboxylic acid or the dianhydride thereof with an appropriate glycol ether. Even though an excess of the said ether is used, complete esterification is not obtained. The excess of the ether may subsequently serve as the solvent for said ester in formulating the said liquid mixture or varnish. The solution of ester is then mixed with the diamine. As described in my said copending application, the liquid mixture is useful as a coating or as an impregnating agent in the preparation laminates, whereby subsequent to application to a substrate the coated or impregnated substrate is heated a temperature of up to about 150° C. to effect reaction of the ester with the diamine for formation of a polyamide prepolymer, which, upon subsequent heating a temperature of up to about 500° C., is converted the polyamide. In the laminate art, a porous substrate, /, a glass fiber textile, is impregnated with the varnish d heated at up to about 150° C. to obtain a prepreg. es of the prepreg are then stacked to a laminate structure, and the stack is heated under pressure at a temperature of from about 150° C. to up to about 500° C., d preferably up to about 350° C. to give a smooth, ll-bonded laminate having a matrix of substantially n-porous polyimide.

Thus, drying and heating of the varnish up to a temperature of, say, about 150° C., results in a condensation reaction to give polyamide having ether-ester )ups, thus:

$$-\overset{O}{\underset{(O=\overset{|}{C}-O-alk-OY)_2}{\overset{\|}{C}}}-R-\overset{O}{\overset{\|}{C}}-OH + H_2N-Z-NH_2 \xrightarrow{-H_2O}$$

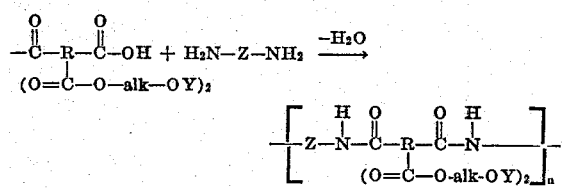

erein alk, R, Y and Z are as above defined, and $n$ lotes the degree of polymerization.

Continued heating, say, at up to about 500° C. and ferably up to about 350° C., results in liberation of ydroxy ether, HO-alk-OY, with intramolecular cyclization to the polyimide:

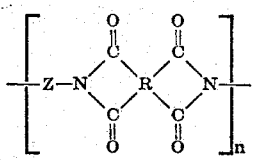

The hydroxy ether is volatilized at a steady rate ing the curing; so that the polyimide which is formed a solid, substantially void-free film or matrix.

According to the present invention, however, when intermediate, polyamide-forming heating step is itted, and the heat-reactive liquid or varnish is dily submitted to the polyimide-forming temperature, , to a temperature of from 150° C. to up to about )° C. there is obtained a foamed polyimide of low isity and very good mechanical strength. Even though iting at above the 150° C. is conducted at a substanly steady rate, liberation of by-product alkylene glymono-ether is accompanied by foaming or expansion the polymeric material to a porous or cellular struc:. Apparently the hydrocarbyloxyalkyl radicals of ester are responsible for the pore-forming phenomena. do not know whether cell-formation is due to the ure of the escaping alkylene glycol mono-ether as npared to the alkanol or water which is given off by prior art polyimide-forming materials, or whether due to the nature of a possibly intermediately formed r/amide. The cell-forming phenomena may stem m a combination of the properly volatile by-product no-ether with the properly impervious or tenuous r/amide intermediate. At any rate, it has been obved that even when foaming is effected by heating n a very dilute varnish at above 150° C., there is med a hard, brittle film over the foaming mass which tainly would be expected to impede an easy escape the evolved glycol.

The invention thus provides a simple and convenient ans of preparing foamed polyimide structures, which method comprises (1) contacting a tetracarboxy compound of the formula

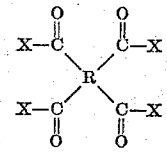

wherein each X denotes —OH when taken singly and two X's taken together stand for —O—, and R is as above defined with an alkylene glycol ether of the formula HO—alk—OY wherein alk and Y are as above defined, to obtain a solution, in said ether of a bis(hydrocarbyloxyalkyl) ester of the formula

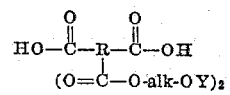

(2) contacting said solution with the diamine $$H_2N-Z-NH_2$$

wherein Z is as above defined, to obtain the heat-reactive liquid mixture or varnish, and subsequently submitting the varnish at a temperature of 150° C. up to about 500° C. to obtain the foamed polyimide.

The diesters may also be prepared by metathesis or cross-esterification, e.g., by reaction of a lower dialkyl tetracarboxylate with the alkylene glycol ether. When said dialkyl tetracarboxylates are reacted with the alkylene glycol ethers to give the diesters, alkanols are the by-products. Although the alkanols are generally poor solvents for polyamide/acids obtained by reaction of diamines with tetracarboxylic acids or the dianhydrides thereof, they are good solvents for the presently useful varnishes. Accordingly, the presence of the by-product alkanols is immaterial.

Examples of the bis(hydrocarbyloxyalkyl) esters which are advantageously the diester constituents of the liquid mixtures or varnishes which are used for preparing the foamed polyimides according to this invention are the simple and mixed esters, e.g., the bis(alkoxyalkyl), the bis(cycloalkoxyalkyl) and the bis(aryloxyalkyl) esters, such as the bis(2-methoxy-, ethoxy-, propoxy-, butoxy-, hexyloxy- or octyloxyethyl), the bis(4-methoxy- or propoxybutyl), bis(3-ethoxy- or methoxypropyl) or the bis (2-ethyl-2-methoxy-3-pentylpropyl), or the bis(2-phenoxyethyl), the bis(4-phenoxybutyl), the 2-phenoxyethyl 3-methoxypropyl, the bis(3-o-, m- or p-tolyloxypropyl), bis[2-(p-hexylphenoxy)ethyl], the 2-benzyloxyethyl 4-ethoxybutyl, or the bis(3-cyclopentyloxypropyl) esters of the aromatic tetracarboxylic acids, generally, so long as such acids are free of non-benzenoid unsaturation and of substituents which react with an amine radical more readily than does the carboxy group and so long as the carboxy and carboxylate radicals are positioned as described above; such as 1,2,4,5 - benzenetetracarboxylic acid; 1,4,5,8 - naphthalenetetracarboxylic acid; 4 - nitro-1,2,5,6-naphthalenetetracarboxylic acid; 3,3',4,4'-biphenyltetracarboxylic acid; 2,2'-dimethoxy-3,3',4,4'-biphenyltetracarboxylic acid; 2,2',3,3' - biphenyltetracarboxylic acid; 3,6 - dimethoxy-1,2,4,5-benzenetetracarboxylic acid; 2,2',5,5' - tetramethyl - 3,3',4,4' - biphenyltetracarboxylic acid; 3,4,9,10 - perylenetetracarboxylic acid; 4,4'-isopropylidenediphthalic acid; 1,8,9,10-phenanthrenetetracarboxylic acid; 4,4' - carbonyldiphthalic acid; 4,4' - [2,2,2 - trifluoro-1-(trifluoromethyl)ethylidene] diphthalic acid; 4,4'-oxydiphthalic acid; 4,4'-sulfonyldiphthalic acid; 2,2'-dichloro - 3,3',4,4' - biphenyltetracarboxylic acid, etc. Presently preferred are the bis(hydrocarbyloxyalkyl) esters of 4,4'-carbonyldiphthalic acid, i.e., compounds of the structure

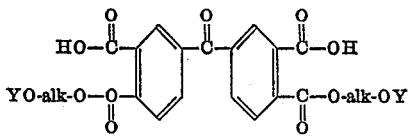

An ester of two or more different alkylene glycol ethers and the aromatic tetracarboxylic acid may be used, e.g., there may be employed mixed esters obtained by esterifying one of the four carboxylic groups with one hydroxy ether and then esterifying another carboxylic group with a different hydroxy ether.

The diamine which is used with the bis(hydrocarbyloxyalkyl) ester may be any aromatic diamine which has from 6 to 18 carbon atoms and which is free of non-benzenoid unsaturation and of substituents which react with the carboxy radical more readily than does the amine radical; e.g., 4,4'-oxydianiline, o-, m- or p-phenylenediamine, benzidine, 3,3'-dimethoxybenzidine, 1,4-, 5,8- or 1,8-naphthalenediamine, 4,4'-sulfonyloxydianiline, 4,4' - methylenedianiline, 4,4' - methylenebis(3-nitroaniline), 4,4' - ethylidenedianiline, 2,3,5,6 - tetramethyl - p-phenylenediamine, 4,4'-oxybis(2,2'-propylaniline) etc.

Two or more different diamines or two or more different bis(hydrocarbyloxyalkyl) esters may be used as the respective amine and carboxylic reactants; e.g., a mixture of an amine such as benzidine and 4,4'-oxydianiline or p-phenylenediamine and 1,8-naphthalenediamine may be present together with a single carboxylic component such as bis(2-ethoxyethyl) 1,2,4,5-benzenetetracarboxylate or bis(3-methoxypropyl) 4,4'-carbonyldiphthalate or with a mixture of carboxylates such as a mixture of bis (3-propoxybutyl) 4,4'-isopropylidenediphthalate and bis (2-methoxyethyl) 3,4,9,10-perylenetetracarboxylate or a mixture of bis(2-butoxyethyl) 4,4'-carbonyldiphthalate and bis(2,3 - dimethyl-4-phenoxybutyl) 4,4' - carbonyldiphthalate. Thereby there are produced foamed polyimides having different linkages dispersed more or less randomly in the polymer molecule. Such an expedient is useful in tailoring polymer structures having properties intermediate to those attributable to the individual linkages.

Because condensation of the bis(hydrocarbyloxyalkyl) ester of a tetracarboxylic acid with the diamine to give the polyimides involves one mole of the diamine with one mole of the ester, the two reactants are advantageously employed in such stoichiometric proportions, i.e., one mole of the ester per mole of the amine. However, a slight excess of either component may be used.

The presently employed varnishes are prepared by simply mixing the diamine with the bis(hydrocarbyloxyalkyl) ester in an inert, organic liquid medium which is a solvent for the ester. However, for facilitating complete reaction within an optimum period, it is preferred to employ a medium in which solution of both the ester and the diamine can be attained. If an excess of the alkylene glycol ether has been employed for esterifying the tetracarboxylic dianhydride, the excess can conveniently serve as solvent in the varnish. Also, if desired, to any excess of the alkylene glycol ether present in the esterification product there may be added one or more other solvents, e.g., a lower alcohol or ether such as butanol or propyl ether. When production of the bis(hydrocarbyloxyalkyl) ester has been conducted by transesterification, e.g., by reaction of an alkylene glycol ether with another diester of the tetracarboxylic acid, there is obtained as by-product a hydroxy compound corresponding to the alcoholic moiety of the starting ester, e.g., a lower alkanol when the starting ester is a dialkyl tetracarboxylate. The by-product hydroxy compound need not be removed from the crude esterification product previous to mixing with the diamine. For example, a dialkyl ester such as dibutyl 4,4'-carbonyldiphthalate is reacted with 2-methoxyethanol to give bis(2-methoxyethyl) 4,4'-carbonyldiphthalate together with butanol as by-product. Without removing the butanol, the reaction mixture is simply mixed with a diamine for obtaining the varnish. The butanol serves as solvent. If dilution of reaction mixture is desired, there may be employed either a lower alkylene glycol or an ether thereof or a lower alcohol, ketone or alkyl ether to give a thinner varnish. In the transesterification reaction as well as in esterification of the free tetracarboxylic acid or dianhydride thereof, an excess of the alkylene glycol ether is conveniently used for providing for proper esterification and for serving as solvent.

Depending upon the quantity of solvent used, the reaction mixture comprising the diester, and the solvent (which advantageously is the same as that used for preparing the bis(hydrocarbyloxyalkyl) ester may be used directly for mixing with diamine. However, previous to heating at 150° C. or above, some of the solvent may be removed by volatilization at ordinary pressure or by evacuation to give a fluid concentrate. Either the fluid concentrate obtained by removing only part of the solvent or a dilute, liquid mixture containing the diester and the diamine in substantially equimolar proportions and having a solids content of at least 10% by weight, and preferably of at least 20% by weight, may be used for preparation of the foamed polyimide. The heating may be conducted either in air or in an inert atmosphere which may be, e.g., nitrogen, argon, or vacuum. Temperatures of from, say, 150° C. to 350° C. are preferred. Within this range, the temperature will depend upon such conditions, as time, pressure and atmosphere, as well as upon the nature of the individual ester and diamine. Generally, a lower temperature will require longer curing time. In experimental runs, the extent of heating can be readily ascertained by noting substantial cessation in weight change owing to volatilization of solvent and of the by-product alkylene glycol resulting from the ring-closing imide-forming reaction between the carboxylate moiety and the unreacted amino radical of the diamine or of an intermediately formed carboxylate-containing polymer. The final foamed structure will be strong and resilient.

For preparation of shaped, cellular articles, the liquid composition or fluid concentrate is simply poured into a mold and heated. Depending upon the density and cell-size desired, heating may be done gradually or abruptly. Thus, the mold with its liquid contents may be placed into an oven which has been preheated to the polyimide-forming temperature, say, 300° C. and maintained at that temperature until expansion has ceased. Or the mold with its contents may be first heated at a temperature sufficient only to volatilize off the solvent and then at about 150° C. to up to about 500° C., and preferably at up to about 350° C. to form the foamed polyimide.

The invention thus provides strong, foamed structures of any size or shape. The presently-provided foamed polyimides are flameproof and highly resistant to heat; they are thus particularly valuable as insulating materials and for this purpose they may be provided in sheet or shredded form. The low-density, toughness and heat-stability of the foamed structures recommend them for use in any application where a combination of these properties is desired. They may be modified in conventional manner, e.g., by incorporation of an electricity-conducting material such as pulverulent carbon black or finely comminuted graphite when electricity-conducting is desired; by the incorporation of other filler, dyes, pigments, etc., for specialty purposes; by using metal fibers, textiles or screens instead of glass fiber cloth as the reinforcing agent in the preparation of porous laminates, etc.

The invention is further illustrated by, but not limited to, the following examples.

EXAMPLE 1

A mixture consisting of 644.4 g. (2 moles) of 4,4'-carbonyldiphthalic anhydride and 692.8 g. (9.1 moles)

2-methoxyethanol was gradually heated, with stirring, about 115° C. and stirring at this temperature was ntinued for 0.5 hour after all of the solids had dislved. The resulting mixture, comprising a solution of s(2 - methoxyethyl) 4,4' - carbonyldiphthalate in 2-:thoxyethanol, was allowed to cool to about 40° C. d 216.2 g. of m-phenylenediamine was added thereto. ie whole was then stirred to solution to give a clear rnish having a solids content of 65.2% in 2-methoxyıanol.

A sample of the varnish in an aluminum container was ated at 70° C. under water aspirator vacuum to re->ve the solvent (the 2-methoxyethanol) and then ated at 200° C. for 15 minutes in order to obtain inition of foaming. Upon increasing the temperature to 5° C., voluminous foaming was noted. Heating at the 5° C. temperature for 15 minutes cured the foam to 'e a hard, light yellow cellular structure of low density d very good resistance to impact.

EXAMPLE 2

A portion of the liquid composition or varnish which s prepared in Example 1 was poured into an alunum cup, and the cup with its contents, without conitration, was placed in an oven which had been preited to 315° C. and maintained in the oven at this nperature for 2 hours. At the end of that time the itents of the cup had been converted into a foamediped structure which was more porous and of lower isity than was the foamed structure obtained in Exiple 1. The hard foam was compressible, but did not :ak upon impact.

The more rapid loss of the by-product hydroxy ether this example, during the 315° C. heating period, is )bably responsible for a difference in cell size, the prod- obtained in Example 1 being more finely pored than t obtained in this example.

Although, for purposes of comparison, the above exples are limited to the bis(2-methoxyethyl) ester of '-carbonyldiphthalic acid as the ester component and m-phenylenediamine as the organic amine component the polyimide-forming liquid compositions, other hy->carbyloxyalkyl esters and other diamines are likewise :ful; thus, instead of the bis(2-methoxyethyl) ester re may be prepared and employed the bis(2-butoxy-yl), the bis(3-benzyloxypropyl) or the bis(2-phenoxy-yl) ester of 4,4'-carbonyldiphthalic acid or 1,2,4,5-izenetetracarboxylic acid or of other tetracarboxylic ds, e.g., 4,4'-isopropylidenediphthalic acid or 2,3,6,7- )hthalenetetracarboxylic acid and instead of the m-:nylenediamine there may be used benzidine or 1,8-)hthalenediamine or 4,4'-oxydianiline or 4,4'-sulfonylniline. The solvent may or may not be the hydrobyloxyalkanol from which the bis(hydrocarbyloxy-yl) ester is derived. For example, instead of employing excess of 2-methoxyethanol in preparing the bis(2-thoxyethyl) ester of 4,4'-carbonyldiphthalic acid as in ample 1, the ester may be prepared by employing in reaction mixture only the stoichiometrically required intity of the 2-methoxyethanol in the presence or ab-ce of an inert, organic liquid diluent. Subsequently, the polyimide-forming reaction, when neither an ex-s of the 2-methoxyethanol nor an extraneous diluent been used in forming the ester, there may be used h diluents as the lower alcohols.

)bviously, many modifications and variations of the ention may be made without departing from the spirit l scope thereof, and therefore, only such limitations >uld be imposed as are indicated in the appended claims. What we claim is:

l. The method of preparing a foamed polyimide which nprises heating, at a temperature of from above 150° to about 500° C., a heat-reactive, polyimide-forming liquid composition consisting essentially of (I) an ester of the formula

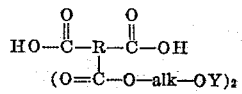

wherein R is a tetravalent aromatic radical of from 6 to 24 carbon atoms, is free of olefinic and acetylenic unsaturation and of substituents which react more readily with duction gearing coupling the rotor shaft with the pinion the amine radical than does a radical containing the

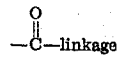

and wherein one pair of the radicals

and

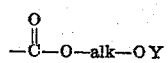

is positioned at a first pair of non-tertiary nuclear carbon atoms which are immediately consecutive and wherein the other pair of the radicals

and

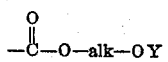

is positioned at a second pair of nontertiary nuclear carbon atoms which are immediately consecutive, said second pair of carbon atoms being separated from the first pair of carbon atoms by at least one carbon atom; alk denotes an alkylene radical having from 2 to 4 carbon atoms in the chain and a total of from 2 to 8 carbon atoms and Y is a hydrocarbyl radical free of olefinic and acetylenic unsaturation and containing from 1 to 8 carbon atoms, (II) a diamine of the formula $$H_2N—Z—NH_2$$

wherein Z is an aromatic radical having from 6 to 18 carbon atoms and being free of olefinic and acetylenic unsaturation and of substituents which react with the carboxy radical more readily than does the amine radical, and (III) an inert, volatilizable organic liquid solvent for said ester.

2. The method defined in claim 1, further limited in that R is

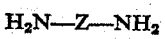

3. The method defined in claim 1, further limited in that Z is phenylene.

4. The method defined in claim 1, further limited in alk is —CH₂CH₂—.

5. The method defined in claim 1, further limited in that Y is alkyl.

6. The method defined in claim 1, further limited in that R is

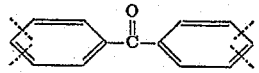

Z is phenylene, alk is —CH₂CH₂— and Y is methyl.

7. The method defined in claim 1, further limited in that the solvent is HO—alk—OY.

8. The method defined in claim 1, further limited in that —alk—OY is —CH₂CH₂—O—alkyl and the solvent is HO—CH₂CH₂—O-alkyl.

9. The method defined in claim 1, further limited in that R is

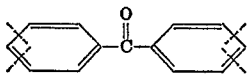

Z is phenylene, —alk—OY is —CH$_2$CH$_2$—O-alkyl, and the solvent is HO—CH$_2$CH$_2$—O-alkyl.

10. The method defined in claim 1, further limited in that R is

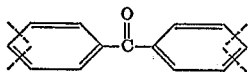

Z is phenylene, alk is —CH$_2$CH$_2$—, Y is methyl, and the solvent is 2-methoxyethanol.

References Cited

UNITED STATES PATENTS

| | | | |
|---|---|---|---|
| 3,179,631 | 4/1965 | Endrey | 260—78 |
| 3,249,561 | 5/1966 | Hendrix | 260—2.5 |
| 3,326,851 | 6/1967 | Tocker | 260—78 XR |
| 3,422,064 | 1/1969 | Call | 260—78 XR |
| 3,423,366 | 1/1969 | DeBrunner et al. | 260—78 XR |

SAMUEL H. BLECH, Primary Examiner

M. FOELAK, Assistant Examiner

U.S. Cl. X.R.

260—37, 78